(12) United States Patent
Woytera et al.

(10) Patent No.: US 10,813,286 B2
(45) Date of Patent: Oct. 27, 2020

(54) SYSTEM AND METHOD FOR ADJUSTING THE FLOW ORIENTATION OF AN AIR FLOW EXHAUSTED FROM AN AGRICULTURAL HARVESTER

(71) Applicant: CNH Industrial America, LLC, New Holland, PA (US)

(72) Inventors: Scott Woytera, Ephrata, PA (US); Brian Scheuring, Sinking Spring, PA (US)

(73) Assignee: CNH Industrial America LLC, New Holland, PA (US)

( * ) Notice: Subject to any disclaimer, the term of this patent is extended or adjusted under 35 U.S.C. 154(b) by 177 days.

(21) Appl. No.: 15/813,299

(22) Filed: Nov. 15, 2017

(65) Prior Publication Data

US 2019/0141891 A1 May 16, 2019

(51) Int. Cl.
*B60K 11/04* (2006.01)
*A01D 41/12* (2006.01)
*F01P 11/10* (2006.01)
*F01N 13/08* (2010.01)

(52) U.S. Cl.
CPC .......... *A01D 41/1252* (2013.01); *B60K 11/04* (2013.01); *F01N 13/08* (2013.01); *F01P 11/10* (2013.01)

(58) Field of Classification Search
CPC .......... B60K 11/04; B60K 11/08; B60K 13/04
USPC .................................................. 180/68.1, 309
See application file for complete search history.

(56) References Cited

U.S. PATENT DOCUMENTS

| | | | | |
|---|---|---|---|---|
| 5,816,350 A | * | 10/1998 | Akira | B60H 1/3227 180/68.1 |
| 5,816,351 A | * | 10/1998 | Akira | B60K 11/08 180/68.1 |
| 6,745,860 B2 | * | 6/2004 | Yabe | E02F 9/0866 180/68.1 |

(Continued)

FOREIGN PATENT DOCUMENTS

| | | |
|---|---|---|
| EP | 3114918 A1 | 1/2017 |
| GB | 1325687 A | 8/1973 |
| JP | 03220023 | 9/1991 |

OTHER PUBLICATIONS

Extended European Search Report for EP Application No. 18.203. 246.6 dated Mar. 26, 2019 (four pages).

*Primary Examiner* — Jeffrey J Restifo
(74) *Attorney, Agent, or Firm* — Peter Zacharias; Patrick Sheldrake (57) ABSTRACT

A system for adjusting the flow orientation of an air flow exhausted at a flow exit location defined along an exterior of an agricultural harvester. The harvester includes an engine upstream of the flow exit location. The system includes a harvester body extending around at least a portion of the exterior of the harvester and defining an opening at the flow exit location; a louvered panel positioned within the opening, the louvered panel including a plurality of louvers each pivotable about a respective pivot axis; and an actuator coupled to the louvers and configured to actuate the louvers such that each louver pivots to adjust a tilt angle of the louver. The air flow is directed through the louvered panel after flowing past the engine and is exhausted from the harvester at a flow angle corresponding to the tilt angle of each of the plurality of louvers.

9 Claims, 7 Drawing Sheets

(56) References Cited

U.S. PATENT DOCUMENTS

| | | | |
|---|---|---|---|
| 6,854,544 B2* | 2/2005 | Vide | B60K 11/085 180/68.1 |
| 7,134,518 B2* | 11/2006 | Arai | B60K 11/04 180/68.1 |
| 7,143,852 B2* | 12/2006 | Yatsuda | B62D 25/10 180/69.2 |
| 7,147,079 B2* | 12/2006 | Brun | B60H 1/00357 180/309 |
| 7,296,407 B2 | 11/2007 | Rose | |
| 7,401,672 B2* | 7/2008 | Kurtz, Jr. | B60K 11/04 180/165 |
| 7,451,843 B2* | 11/2008 | Nakashima | B60K 11/08 180/68.1 |
| 7,753,152 B2* | 7/2010 | Nakae | B60K 11/04 165/122 |
| 7,841,314 B2* | 11/2010 | Nakashima | E02F 9/0866 123/198 E |
| 8,161,919 B2* | 4/2012 | Klotz | B60K 11/085 123/41.04 |
| 8,181,727 B2* | 5/2012 | Ritz | B60K 11/085 180/68.1 |
| 8,281,754 B2* | 10/2012 | Saida | B60K 11/085 123/41.04 |
| 8,292,014 B2* | 10/2012 | Sugiyama | B60K 11/085 123/41.06 |
| 8,316,805 B2* | 11/2012 | Kardos | F01P 5/06 123/41.04 |
| 8,327,811 B2 | 12/2012 | Hokimoto | |
| 8,517,130 B2* | 8/2013 | Sakai | B60K 11/085 180/68.1 |
| 8,561,738 B2* | 10/2013 | Charnesky | B60K 11/085 180/68.1 |
| 8,627,911 B2* | 1/2014 | Tregnago | B60K 11/085 180/68.1 |
| 8,646,552 B2* | 2/2014 | Evans | B60K 11/085 180/68.1 |
| 8,720,624 B2* | 5/2014 | Remy | B60K 11/085 180/68.1 |
| 8,783,398 B2* | 7/2014 | Wlezien | E02F 9/0891 180/68.1 |
| 8,833,498 B2* | 9/2014 | Charnesky | F01P 7/10 180/68.1 |
| 8,875,823 B2* | 11/2014 | Lauper, Jr. | F01P 5/06 180/68.1 |
| 8,875,824 B1* | 11/2014 | Yamamitsu | B60R 19/52 180/68.1 |
| 8,893,834 B2* | 11/2014 | Berkeland | B62D 25/12 180/68.1 |
| 8,915,320 B2* | 12/2014 | Chinta | B60K 11/085 180/68.1 |
| 8,936,121 B2* | 1/2015 | Vacca | B60K 11/04 165/44 |
| 8,983,736 B2* | 3/2015 | Hirota | B60K 11/08 701/49 |
| 9,309,643 B2* | 4/2016 | Yamagoe | F01P 1/06 |
| 9,708,792 B2* | 7/2017 | Hirayama | E02F 9/0866 |
| 9,810,138 B2* | 11/2017 | Solazzo | B60K 11/085 |
| 10,066,358 B2* | 9/2018 | Ota | F01P 5/02 |
| 10,443,548 B2* | 10/2019 | Shonk | F02M 35/086 |
| 10,472,776 B2* | 11/2019 | Zhao | B62D 49/00 |
| 10,487,476 B2* | 11/2019 | Kumagai | F01P 5/04 |
| 2007/0012000 A1 | 1/2007 | Maas et al. | |
| 2012/0067305 A1 | 3/2012 | Sato et al. | |
| 2017/0006764 A1 | 1/2017 | Farley et al. | |

* cited by examiner

SYSTEM AND METHOD FOR ADJUSTING THE FLOW ORIENTATION OF AN AIR FLOW EXHAUSTED FROM AN AGRICULTURAL HARVESTER

FIELD OF THE INVENTION

The present subject matter relates generally to agricultural harvesters and, more particularly, to a system and method that utilizes adjustable louvers for adjusting the flow orientation of an air flow exhausted from an agricultural harvester.

BACKGROUND OF THE INVENTION

Agricultural harvesters are used to cut crops from a field, process the crops to separate grain from the remainder of the plant, and return the remainder to the fields. Typically, the remainder is comprised of crop residue and chaff, which are discharged, separately or together, onto a field as a windrow or directed into a chopper and/or spreader mounted on or at the rear end of the harvester that is operable to spread the residue over a swath of a field. Such discharge methods often create large clouds of dust behind the harvester that may settle and accumulate near or on hot exhaust or hot engine parts, creating a risk of fire.

Additionally, in many instances, the engines used within agricultural harvesters can create a substantial amount of noise. Such engine noise can be particularly problematic when transporting harvesters on roads between agricultural sites. For instance, local noise ordinances or regulations may require that all vehicles traveling along roads within the jurisdiction maintain their operating noise level below a given threshold. As a result, the noise output from a harvester engine must be maintained at a level at or below the noise thresholds associated with any applicable noise ordinances/regulations.

Accordingly, a system and method for adjusting the flow orientation of an air flow exhausted from an agricultural harvester in a manner that addresses one or more of the issues described above, such as by reducing dust accumulation and/or by reducing the noise levels near the harvester, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for adjusting the flow orientation of an air flow exhausted from an agricultural harvester at a flow exit location defined along an exterior of the harvester. The harvester includes an engine disposed upstream of the flow exit location. The system includes a harvester body, a louvered panel, and an actuator. The harvester body extends around at least a portion of the exterior of the harvester, the harvester body defining an opening at the flow exit location through which the air flow is directed after flowing past the engine. The louvered panel is positioned within the opening defined by the harvester body, the louvered panel including a plurality of louvers, each louver being pivotable about a respective pivot axis extending longitudinally between opposed ends of the louver. The actuator is coupled to the louvers, the actuator being configured to actuate the louvers such that each louver pivots about its respective pivot axis to adjust a tilt angle of the louver, wherein the air flow is directed through the louvered panel and is exhausted from the harvester at a flow angle corresponding to the tilt angle of each of the plurality of louvers.

In another aspect, the present subject matter is directed to an agricultural harvester including a fluid cooling system, an engine positioned downstream of the fluid cooling system, an engine compartment body, a louvered panel, and an actuator. The engine compartment body defines an engine compartment for housing the fluid cooling system and the engine, the engine compartment body further defines an opening at a flow exit location positioned downstream of both the fluid cooling system and the engine such that an air flow directed through the engine compartment flows past the fluid cooling system and the engine prior to flowing through the opening. The louvered panel is positioned within the opening defined by the engine compartment body, the louvered panel includes a plurality of louvers, each louver being pivotable about a respective pivot axis extending longitudinally between opposed ends of the louver. The actuator is coupled to the louvers, the actuator being configured to actuate the louvers such that each louver pivots about its respective pivot axis to adjust a tilt angle of the louver, wherein the air flow is directed through the louvered panel and is exhausted from the harvester at a flow angle corresponding to the tilt angle of each of the plurality of louvers.

In a further aspect, the present subject matter is directed to a method for adjusting the flow orientation of an air flow exhausted from an agricultural harvester at a flow exit location defined along an exterior of the harvester. The harvester includes an engine disposed upstream of the flow exit location and a louvered panel positioned at the flow exit location, the louvered panel includes a plurality of louvers. The method includes controlling, with a computing device, an operation of an actuator coupled to the plurality of louvers such that each louver is maintained at a first tilt angle for allowing the air flow to be directed through the louvered panel and exhausted from the harvester at a first flow angle; receiving, with a computing device, an input indicative of a change in an operating mode of the harvester; and, in response to the input, controlling, with the computing device, the operation of the actuator such that each louver is pivoted to a second tilt angle to allow the air flow to be directed through the louvered panel and exhausted from the harvester at a second flow angle, the first flow angle differing from the second flow angle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for adjusting the flow orientation of an air flow exhausted from an agricultural harvester. Specifically, in several embodiments, the disclosed system includes one or more louvered panels having a plurality of louvers supported thereon, with each louver being pivotable or tiltable about its longitudinal axis to allow a tilt angle of each louver to be adjusted. In addition, the system may include an actuator coupled to the louvers to allow the tilt angles of the louvers to be adjusted automatically based on control signals received from a controller of the system. As such, by positioning the louvered panel(s) at or adjacent to a location at which an air flow is being exhausted from the harvester, the tilt angles of the louvers may be controlled to adjust the flow orientation or direction of the air flow as it passes through the louver panel.

In a particular embodiment of the present subject matter, the louvered panel(s) may be installed at or adjacent to an aft end of an engine compartment of a harvester, such as at the aft end of an engine compartment body defining the harvester's engine compartment. In such an embodiment, an air flow, such as a cooling air flow, may be directed through the engine compartment so that the air flow is directed past one or more heat exchangers as well as the engine prior to being exhausted from the engine compartment at the aft end of the engine compartment body. In accordance with aspects of the present subject matter, the disclosed louvered panel(s) may be installed at the aft end of the engine compartment body to allow the orientation of the air flow being exhausted from the engine compartment to be adjusted as desired. For instance, when it is desired to control the flow of dust around the aft end of the engine compartment body, the louvers may be tilted downwardly such that the air flow exhausted from the engine compartment passes through the louvered panel(s) and is directed downwardly to "knock down" the dust. Similarly, when it is desired to control the noise output from the engine compartment, the louvers may be tilted upwardly to redirect the noise emitted from the engine compartment, thereby reducing the noise level that can be heard by a bystander located behind the harvester.

Additionally, in one embodiment, the orientation of the louvers may be automatically controlled (e.g., via control of the actuator by the system controller) based on the current operating mode of the harvester. For instance, when the harvester is being used to harvest crops (e.g., in a "harvesting mode"), the orientation of louvers may be automatically adjusted to a predetermined, downwardly oriented tilt angle to control dust accumulation within and/or around the harvester's engine compartment. Similarly, when the harvester is being operated on a road (e.g., in a transport or "road mode"), the orientation of louvers may be automatically adjusted to a predetermined, upwardly oriented tilt angle to redirect the noise output from the engine compartment.

It should be appreciated that the terms "forward", "aft", "left" and "right" when used in connection with the agricultural harvester and/or components thereof are usually determined with reference to the direction of forward operative travel of the harvester, but they should not be construed as limiting.

Figure 1:
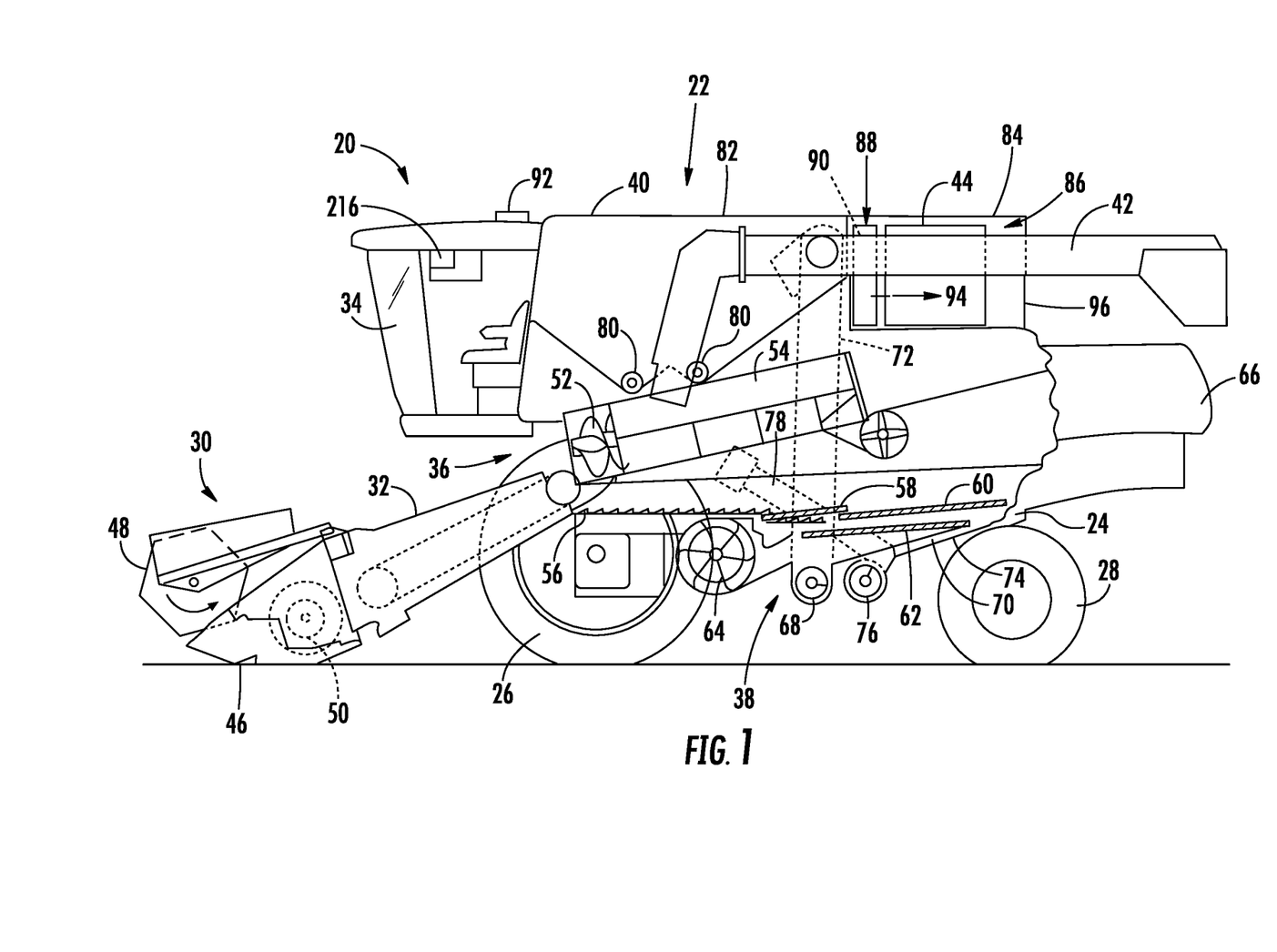
FIG. 1 illustrates a side view of one embodiment of an agricultural harvester in accordance with aspects of the present subject matter.

Referring now to the drawings, and more particularly to FIG. 1, an agricultural harvester 20 is shown, which generally includes a harvester body 22, a chassis 24, ground engaging wheels 26, 28, a header 30, a feeder housing 32, an operator cab 34, a threshing and separating system 36, a cleaning system 38, a grain tank 40, and an unloading conveyance system 42. Although the unloading conveyance system 42 is shown in FIG. 1 as being an unloading auger, it should be appreciated that the system 42 can also be configured as a belt conveyor, chain elevator, etc.

In one embodiment, the front wheels 26 may be larger flotation type wheels, while the rear wheels 28 may correspond to smaller, steerable wheels. Additionally, motive force is selectively applied to the front wheels 26 through a power plant in the form of an internal combustion engine 44 and a transmission (not shown). It should be appreciated that, although the harvester 20 is shown as including wheels 26, 28, it is also to be understood that the harvester 20 may, instead, include tracks, such as full tracks or half-tracks.

As shown in FIG. 1, the header 30 is mounted to the front of the harvester 20 and includes a cutter bar 46 for severing crops from a field during forward motion of the harvester 20. A rotatable reel 48 feeds the crop into the header 30, and a double auger 50 feeds the severed crop laterally inwardly from each side toward the feeder housing 32. The feeder housing 32, in turn, conveys the cut crop to the threshing and separating system 36, and is selectively vertically movable using appropriate actuators, such as hydraulic cylinders (not shown).

In several embodiments, the threshing and separating system 36 is of the axial-flow type, and generally includes a rotor 52 at least partially enclosed by and rotatable within a corresponding perforated concave 54. The cut crops are threshed and separated by the rotation of the rotor 52 within the concave 54, and larger elements, such as stalks, leaves and the like are discharged from the rear of harvester 20. Smaller elements of crop material including grain and non-grain crop material, including particles lighter than grain, such as chaff, dust and straw, are discharged through perforations of the concave 54.

Grain which has been separated by the threshing and separating system 36 falls onto a grain pan 56 and is conveyed toward the cleaning system 38. As shown in FIG. 1, the cleaning system 38 may include an optional pre-cleaning sieve 58, an upper sieve 60 (also known as a chaffer sieve), a lower sieve 62 (also known as a cleaning sieve), and a cleaning fan 64. Grain located on the sieves 60, 62, 64 is subjected to a cleaning action by the fan 64, which provides airflow through the sieves to remove chaff and other impurities, such as dust from the grain, by making this material airborne for discharge from a straw hood 66 of the harvester 20. Specifically, the grain pan 56 and the pre-cleaning sieve 58 are configured to oscillate in a fore-to-aft manner to transport the grain and finer non-grain crop material to the upper surface of the upper sieve 60. Additionally, the upper sieve 60 and the lower sieve 62 are vertically arranged relative to each other, and likewise oscillate in a fore-to-aft manner to spread the grain across the sieves 60, 62, while permitting the passage of cleaned grain by gravity through the openings of the sieves 60, 62.

Clean grain falls to a clean grain auger 68 positioned crosswise below and in front of the lower sieve 62. Specifically, the clean grain auger 68 receives clean grain from each sieve 60, 62 and from a bottom pan 70 of the cleaning system 38. The clean grain auger 68 then conveys the clean grain laterally to a generally vertically arranged grain elevator 72 for transport to the grain tank 40. Tailings from the cleaning system 38 fall to a tailings auger trough 74, and are transported via a tailings auger 76 and a return auger 78 to the upstream end of the cleaning system 38 for repeated cleaning action. Additionally, cross augers 80 at the bottom of the grain tank 40 convey the clean grain within the grain tank 40 to unloading conveyance system 42 (e.g., an unloading auger) for discharge from the harvester 20.

In general, the harvester body 22 may be configured to extend around and/or to define at least a portion of an exterior 82 of the harvester 20. As shown in FIG. 1, the harvester body 22 may, in several embodiments, include or form part of an engine compartment body 84 that generally defines a substantially enclosed volume or engine compartment 86 for housing the engine 44. In addition to the engine 44, a cooling system 88 may also be housed within the engine compartment body 84 for cooling at least one component onboard the harvester 20. For example, the cooling system 88 may include one or more heat exchangers 90 configured to provide a cooled fluid flow for cooling the engine 44, exhaust and combustion gases associated with the engine 44, a hydraulic circuit (not shown), an air conditioning (A/C) circuit 92 associated with the operator cab 34, and/or other fluid carrying components. The cooling system 88 can be configured with any combination of cooling circuits, and can all be the same, partially the same, or all different. In the event that one or more of the cooling circuits are configured different relative to other cooling circuits, then those cooling circuits are likely independent from each other. However, if multiple cooling circuits are configured the same, then those cooling circuits can be independent from each other or can be coupled together in series or parallel. The cooling circuits are configured for cooling a corresponding type of fluid, such as a cooling fluid for an IC engine, hydraulic oil in a hydraulic power circuit, a refrigerant fluid used in an A/C circuit, etc.

As shown in FIG. 1, an air flow (indicated by arrow 94) may be directed through the engine compartment 86 such that the air flow 94 flows past both the cooling system 88 and the engine 44. For instance, given that the engine 44 is positioned downstream of the cooling system 88, the air flow 94 may initially flow past and/or through the heat exchanger(s) 90 of the cooling system 88 prior to flowing past and/or through the engine 44. The air flow 94 may then be exhausted from the engine compartment at a flow exit location 96 defined at or adjacent to the aft end of the engine compartment body 84. For instance, an opening 98 (FIG. 3) may be defined through the aft end of the engine compartment body 84 to allow the air flow 94 to be exhausted or expelled from the engine compartment 86 at the flow exit location 96. Additionally, as will be described below, one or more louvered panels may, in accordance with aspects of the present subject matter, be installed at the flow exit location 96 to allow the flow orientation or direction of the air flow 94 exiting the engine compartment 86 to be adjusted, as desired or as is necessary.

It should be appreciated that the configuration of the harvester 20 described above and shown in FIG. 1 is provided only to place the present subject matter in an exemplary field of use. Thus, it should be appreciated that the present subject matter may be readily adaptable to any manner of harvester configuration.

Figure 2:
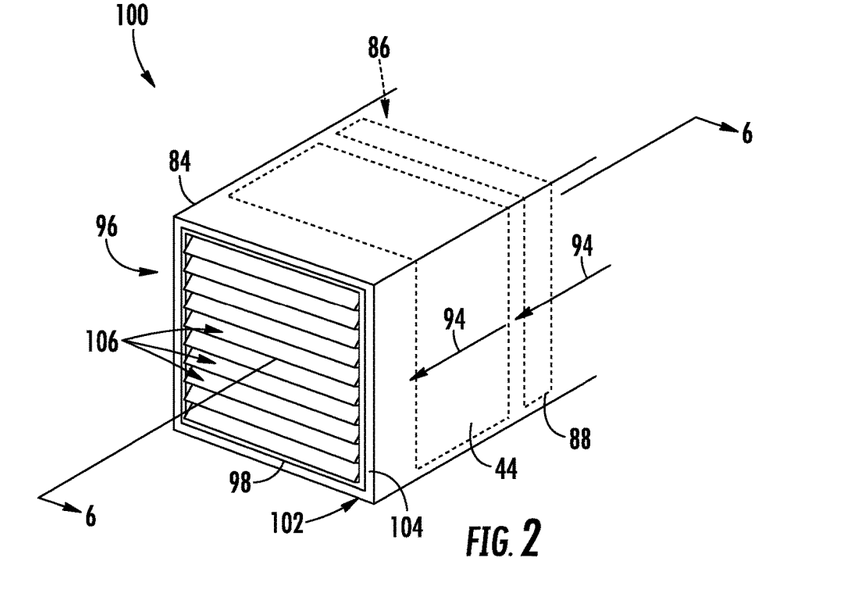
FIG. 2 illustrates an assembled, perspective view of one embodiment of a system for adjusting the flow orientation of an air flow exhausted from a harvester in accordance with aspects of the present subject matter, particularly illustrating the various system components installed relative to an aft end of an engine compartment body of the harvester.
Figure 3:
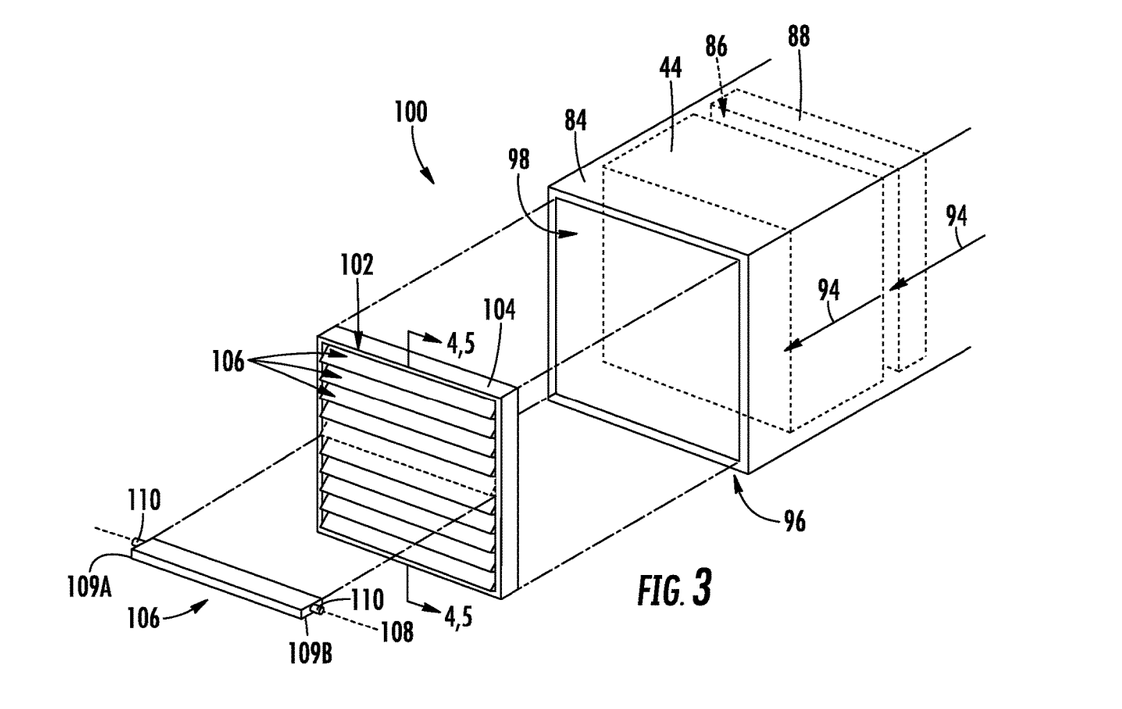
FIG. 3 illustrates a perspective view of the system shown in FIG. 2, particularly illustrating a louvered panel of the system exploded away from the engine compartment body of the harvester.
Figure 4:
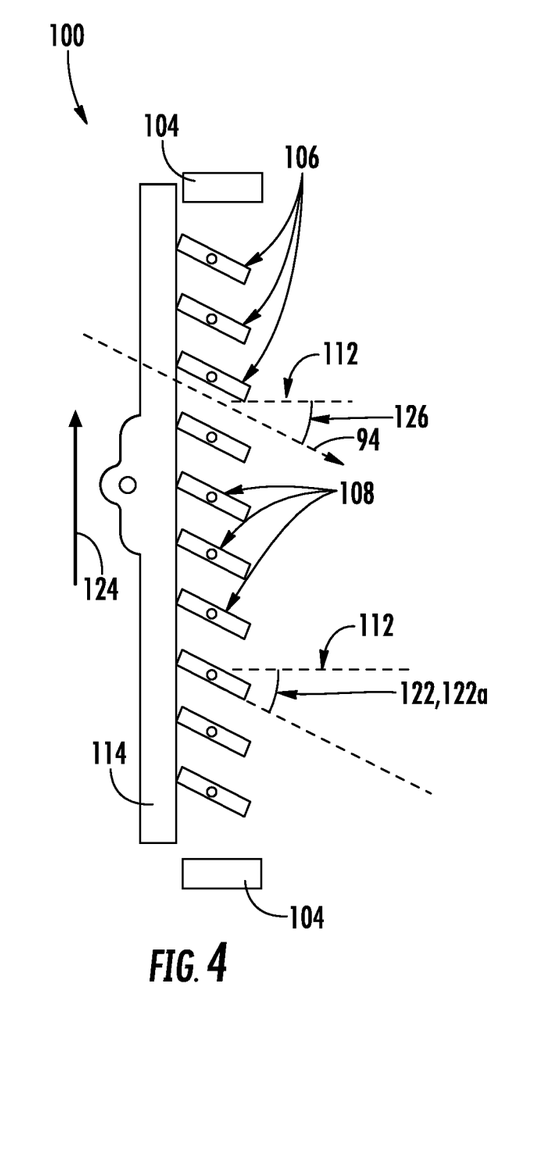
FIG. 4 illustrates a cross-sectional view of the louvered panel shown in FIG. 3 taken about line 4,5-4,5, particularly illustrating louvers of the louvered panel provided at a first orientation or tilt angle.
Figure 5:
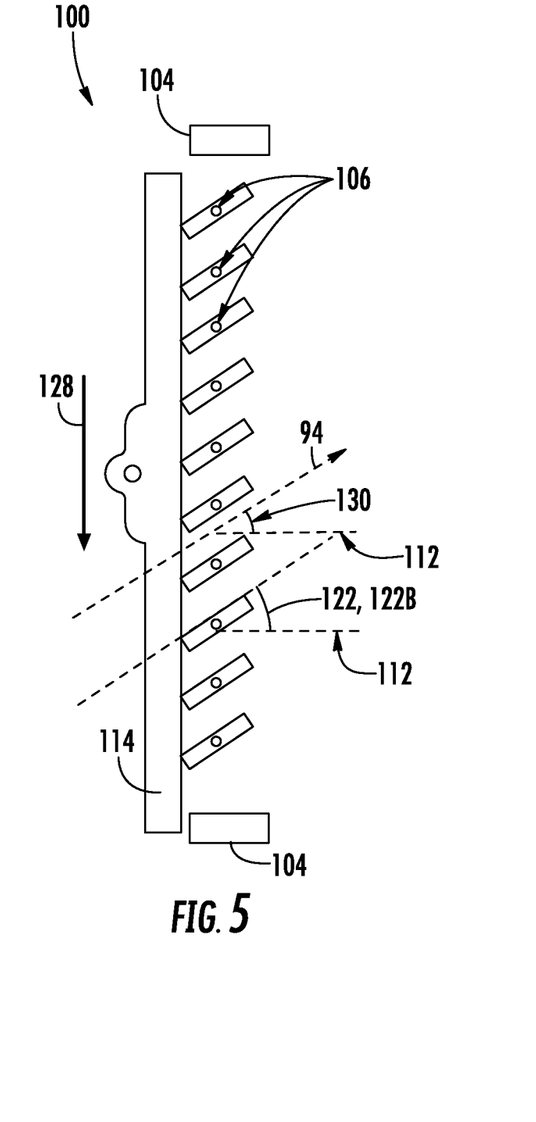
FIG. 5 illustrates another cross-sectional view of the louvered panel shown in FIG. 3 taken about line 4,5-4,5, particularly illustrating the louvers of the louvered panel provided at a second orientation or tilt angle that differs from the first orientation or tilt angle.
Figure 6:
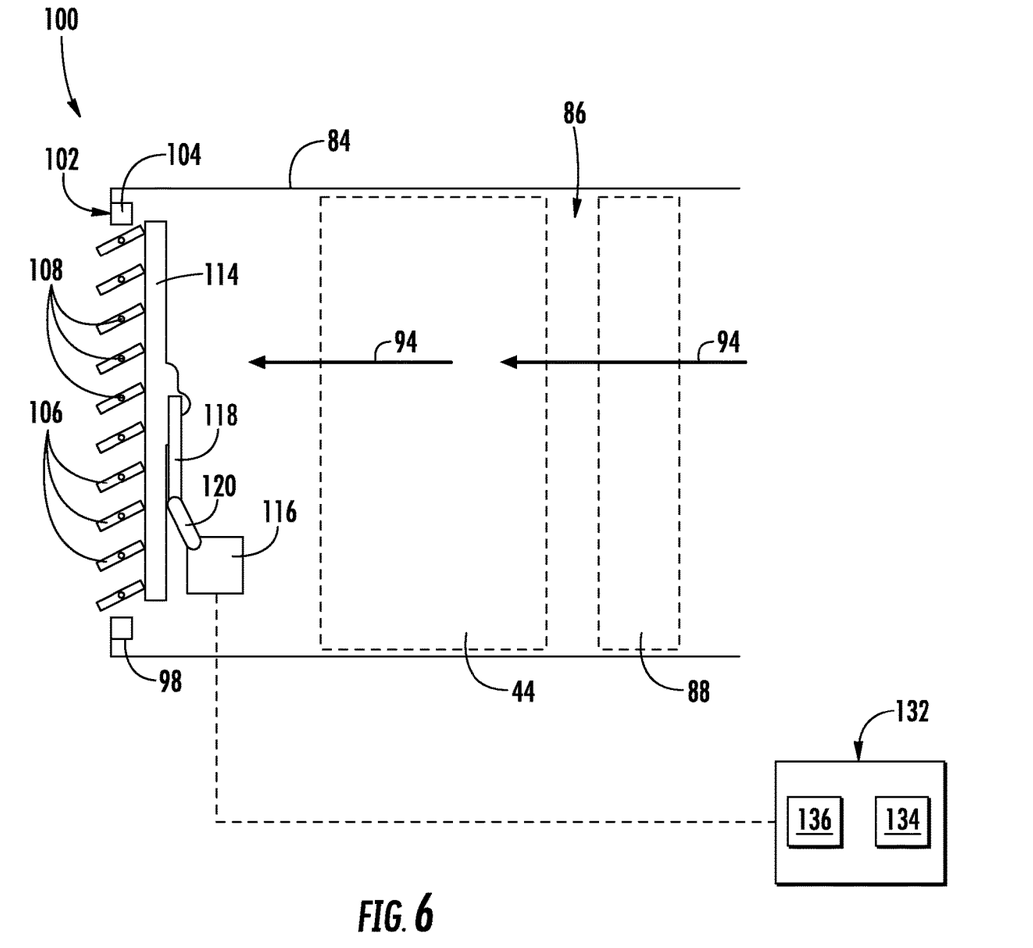
FIG. 6 illustrates a cross-sectional view of the assembled view of the system shown in FIG. 2 taken about line 6-6, particularly illustrating an actuator coupled to the louvers of the louvered panel for pivoting the louvers about their respective pivot or longitudinal axes.

Referring now to FIGS. 2-6, one embodiment of a system 100 for adjusting the flow orientation of an air flow exhausted from an agricultural harvester is illustrated in accordance with aspects of the present subject matter. Specifically, FIGS. 2 and 3 illustrate assembled and exploded views, respectively, of the system 100, particularly illustrating a louvered panel 102 of the system 100 assembled relative to the engine compartment body 84 of the harvester 20 in FIG. 2 and the louvered panel 102 exploded away from the engine compartment body 84 in FIG. 3. Additionally, FIG. 3 also illustrates one of the louvers of the louvered panel 102 exploded away from the remainder of the panel 102. FIGS. 4 and 5 illustrate cross-sectional views of the louvered panel 102 shown in FIG. 3 taken about line 4,5-4,5, with louvers of the louvered panel 102 being shown tilted or pivoted to a first orientation or tilt angle in FIG. 4 and tilted or pivoted to a second orientation or tilt angle in FIG. 5. Moreover, FIG. 6 illustrates a cross-sectional view of the assembled system components shown in FIG. 2 taken about line 6-6.

It should be appreciated that, for purposes of description, the system 100 will generally be described with reference to the harvester 20 shown in FIG. 1 and, in particular, with reference to the air flow 94 expelled from the engine compartment 86 at the flow exit location 96 defined at the aft end of the engine compartment body 84. However, in other embodiments, the system 100 may be utilized within any other suitable harvester having any other suitable configuration and/or at any other suitable location on and/or within a harvester at which it is desirable to allow the flow orientation of an air flow flowing through and/or being expelled from a harvester to be adjusted.

As shown in the illustrated embodiment, the system 100 generally includes one or more louvered panels configured to be installed at or adjacent to the flow exit location 96 at which the air flow 94 directed through the engine compartment 86 is expelled from the engine compartment body 84. For example, as particularly shown in FIG. 3, an opening 98 may be defined at the rearward or aft end of the engine compartment body 84 through which the air flow 94 is configured to be directed after flowing past and/or through the cooling system 88 and the engine 44. In such an embodiment, a louvered end panel 102 may be configured to be installed within the opening 98 such that the air flow 94 is directed through the louvered panel 102 when being expelled from the engine compartment 86.

As shown in the illustrated embodiment, the louvered end panel 102 may generally include a panel frame 104 and a plurality of louvers 106 supported within the panel frame 104. In general, the panel frame 104 may be configured to be installed relative to the opening 98 so that the air flow 94 expelled from the engine compartment 86 flows through the frame 104 and past the various louvers 106 supported therein. As such, the frame 104 may generally have any suitable dimensional configuration that allows it to be installed relative to the opening 98 in a manner to permit the louvered end panel 102 to function as described herein. For instance, in one embodiment, the panel frame 104 may be configured to define the same or similar dimensions as that of the opening 98 to allow the panel frame 104 to be inserted within the opening 98 and subsequently secured to the adjacent sides or portions of the engine compartment body 84 (e.g., via suitable fasteners, such as bolts or screws).

In general, the louvers 106 of the louvered panel 102 may be configured to be pivotally supported within the frame 104 so as to allow each louver 106 to be pivotable or tiltable relative to the frame 104 about a respective pivot axis 108 (FIG. 3) extending longitudinally between opposed ends of each louver 106. For example, as shown in FIG. 3, each louver 106 may extend lengthwise between a first end 109A and a second end 109B, with each end 109A, 109B configured to be pivotally coupled to the panel frame 104 (e.g., via louver pins 110 extending into corresponding openings (not shown) defined in the frame 104). As a result, each louver 106 may be pivoted or tilted relative to the panel frame 104 about its respective pivot axis 108, thereby allowing the orientation or tilt angle of each louver 106 to be adjusted relative to a horizontal reference plane 112 (FIGS. 4 and 5) passing through the pivot axis 108 of each louver 106.

It should be appreciated that the louvers 106 may generally be configured to have any suitable cross-sectional shape. For instance, in the illustrated embodiment, the louvers 106 define a generally rectangular-shaped cross-section. However, in other embodiments, the louvers 106 may define any other suitable cross-sectional shape, such as an arced shape, an airfoil shape, or any other suitable shape. Additionally, the louvers 106 may generally be formed from any suitable material, such as any suitable metal material.

Additionally, in several embodiments, the louvered panel 102 may also include a tie bar or connection member 114 coupled to one or more sections or groups of the louvers 106. In such embodiments, the group of louvers 106 coupled to the connection member 114 may be configured to be simultaneously pivoted or tilted about their respective pivot axes 108. Thus, by actuating the connection member 114, each louver within the group(s) of louvers 106 tied or otherwise coupled to the connection member 114 may be pivoted across a given range of tilt angles. As particularly shown in FIGS. 4-6, in the illustrated embodiment, the connection member 114 is coupled to all of the louvers 106 included within the louvered panel 102, thereby allowing for simultaneous pivoting of each and every louver 106 about its respective pivot axis 108. However, as will be described below with reference to FIGS. 7 and 8, in other embodiments, separate groups of louvers 106 may be connected together for simultaneous pivoting via two or more connection members 114. Additionally, as shown in FIGS. 4-6, in the illustrated embodiment, the connection member 114 is coupled to an upstream side of each of the louvers 106, such as at a central location between the opposed ends 109A, 109B of each louver 106. However, in other embodiments, the connection member 114 may be connected to a downstream side of each of the louvers 106 and/or may be coupled to each louver 106 at any other suitable location defined between its opposed ends 109A, 109B.

Moreover, as particularly shown in FIG. 6, the system 100 may also include an actuator 116 coupled to the connection member 114, such as by coupling the actuator 116 directly to the connection member 114 or indirectly via one or more linkages 118, 120. In general, the actuator 116 may be configured to actuate the connection member 114 relative to the panel frame 104 so as to allow the various louvers 106 coupled thereto to be simultaneously pivoted or tilted about their respective pivot axes 108, thereby allowing a tilt angle 122 (FIGS. 4 and 5) of each louver 106 to be adjusted relative its local horizontal reference plane 112. For instance, in the illustrated embodiment, by actuating the connection member 114 vertically upwardly relative to the panel frame 104 (e.g., as indicated by arrow 124 in FIG. 4), the louvers 106 may be pivoted about their respective axes 108 to a negative tilt angle 122A relative to each local horizontal reference plane 112 such that each louver 106 has a downwardly directed orientation between its upstream and downstream sides. As a result, the air flow 94 may be directed through the louvered panel 102 at a downwardly directed or negative flow orientation or angle 126 generally corresponding to the negative tilt angle 122A of the louvers 106. Similarly, in the illustrated embodiment, by actuating the connection member 114 vertically upwardly relative to the panel frame 104 (e.g., as indicated by arrow 128 in FIG. 5), the louvers 106 may be pivoted about their respective axes 108 to a positive tilt angle 122B relative to each local horizontal reference plane 112 such that each louver 106 has a upwardly directed orientation between its upstream and downstream sides. As a result, the air flow 94 may be directed through the louvered panel 102 at an upwardly directed or positive flow orientation or angle 130 generally corresponding to the positive tilt angle 122B of the louvers 106.

It should be appreciated that, as used herein, a "positive" angle, such as a positive tilt angle 122B or positive flow angle 130, corresponds to an angle ranging between zero degrees and 90 degrees that is defined vertically upwardly relative to a horizontal reference plane, such as local horizontal plane 112. Similarly, as used herein, a "negative" angle, such as a negative tilt angle 122A or negative flow angle 126, corresponds to an angle ranging between zero degrees and 90 degrees that is defined vertically downwardly relative to a horizontal reference plane, such as local horizontal plane 112.

It should be appreciated that the actuator 116 may generally correspond to any suitable actuation mechanism or device that is configured to actuate the connection member 114 so as to allow the louvers 106 to be rotated or pivoted about their respective pivot axes 108. For instance, in one embodiment, the actuator 116 may correspond to a fluid-activated cylinder, such as a pneumatic or hydraulic cylinder, or a solenoid-activated cylinder. Alternatively, the actuator 116 may correspond to any other suitable actuation device(s), including any suitable linear actuation devices known in the art. It should also be appreciated that, although the actuator 116 will generally be described herein as being electronically controlled, the actuator 116 may, instead, be configured to be manually controlled. In such an embodiment, the operator may be allowed to manually operate the actuator 116 to actuate the connection member 114, thereby allowing the tilt angles 122 of the louvers 106 to be manually adjusted.

Moreover, as shown in FIG. 6, the system 100 may also include a controller 132 configured to electronically control the operation of one or components of the system 100. For instance, in the illustrated embodiment, the controller 132 is communicatively coupled to the actuator 116 for controlling the operation thereof. As a result, by transmitting suitable control signals to the actuator 116, the controller 132 may be configured to automatically adjust the tilt angle of each louver 106, thereby allowing the controller 132 to regulate the flow orientation or angle of the air flow 94 being directed through the louvered panel 102.

It should be appreciated the controller 132 may generally comprise any suitable processor-based device known in the art, such as one or more computing devices. Thus, in several embodiments, the controller 132 may include one or more processor(s) 134 and associated memory 136 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 136 of the controller 132 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 136 may generally be configured to store suitable computer-readable instructions that, when implemented by the processor(s) 134, configure the controller 132 to perform various computer-implemented functions, such as the method described below with reference to FIG. 11. In addition, the controller 132 may also include various other suitable components, such as a communications circuit or module, one or more input/output channels, a data/control bus and/or the like.

It should also be appreciated that the controller 132 may correspond to an existing controller of the harvester 20 (e.g., an existing vehicle controller or engine controller) or the controller 132 may correspond to a separate controller. For instance, in one embodiment, the controller 132 may form all or part of a separate plug-in module that may be installed within the harvester 20 to allow for the disclosed system and method to be implemented without requiring additional software to be uploaded onto existing control devices of the harvester 20.

In several embodiments, the controller 132 may be configured to automatically adjust the tilt angles 122 of the louvers 106 (e.g., via control of the operation of the actuator 116) based on the current operating mode of the harvester 20. Specifically, in several embodiments, the desired tilt angle 122 of the louvers 106 may differ depending on whether the harvester 20 is being operated within a "harvesting mode" or a "road mode" (also referred to as a "transport" mode). For example, when the harvester 20 is operating in its "harvesting mode" (and, thus, is actively harvesting crop from a field), it may be desirable to tilt the louvers 106 to a negative tilt angle, such as the tilt angle 122A shown in FIG. 4, so that the air flow 94 directed through the louvered panel 102 is expelled therefrom at a downwardly directed flow orientation, such as at the negative flow angle 126 shown in FIG. 4. Such a downwardly oriented air flow may be utilized to "knock down" or otherwise push away any dust and/or other debris contained within the air flowing around the engine compartment body 84. Similarly, when the harvester 20 operating in its "road mode" (and, thus, is being driven on a road or is otherwise being transported), it may be desirable to tilt the louvers 106 to a positive tilt angle, such as the tilt angle 122B shown in FIG. 5, so that the air flow 94 directed through the louvered panel 102 is expelled therefrom at an upwardly directed flow orientation, such as at the positive flow angle 130 shown in FIG. 5. Such an upward orientation of the louvers 106 may allow engine noise from the engine 44 to be muffled or otherwise redirected, thereby reducing the overall noise generation or emission at the aft end of the harvester 20.

It should be appreciated that the controller 132 may generally be configured to identify the current operating mode of the harvester 20 using any suitable means and/or based on any suitable input data or other information received by the controller 132. For instance, in one embodiment, the controller 132 may be configured to receive an input associated with the current operating mode of the harvester 20, such as an input from the operator (e.g., via an input device 216 located within the cab 34) indicating the selection of the "harvesting mode" or the "road mode." In such an embodiment, when the controller 132 receives an input indicating that the operating mode of the harvester 20 is being switched from the "road mode" to the "harvesting mode" (e.g., after the harvester 20 has been transported to a field and is ready to begin harvesting crops), the controller 132 may be configured to control the operation of the actuator 116 such that the tilt angles 122 of the louvers 106 are adjusted to the desired tilt angle, such as the negative tilt angle 122A shown in FIG. 4. Similarly, when the controller 132 receives an input indicating that the operating mode of the harvester 20 is being switched from the "harvesting mode" to the "road mode" (e.g., after harvesting is complete and the harvester 20 is ready to be transported to a different field or to any other location), the controller 132 may be configured to control the operation of the actuator 116 such that the tilt angles 122 of the louvers 106 are adjusted to the desired tilt angle, such as the positive tilt angle 122B shown in FIG. 5.

As indicated above, in the embodiment of FIGS. 2-6, the various louvers 106 are all configured to be tilted simultaneously about their respective pivot axes 108 via the common coupling provided by the connection member 114. However, in other embodiments, the louvers 106 may be grouped or sectioned off into separate louver sections, with each louver section including one or more of the louvers 106 supported within the panel frame 104. In such an embodiment, the tilting of the louver(s) 106 within each louver section may be controlled or actuated independently of the tilting of the louver(s) 106 included within a separate louver section of the louvered panel 102.

Figure 7:
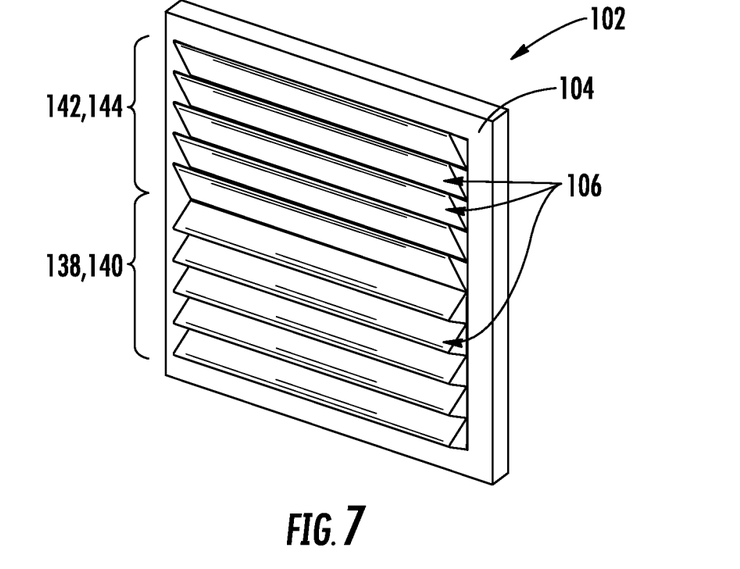
FIG. 7 illustrates a front, perspective view of another embodiment of a louvered panel suitable for use within the disclosed system in accordance with aspects of the present subject matter.
Figure 8:
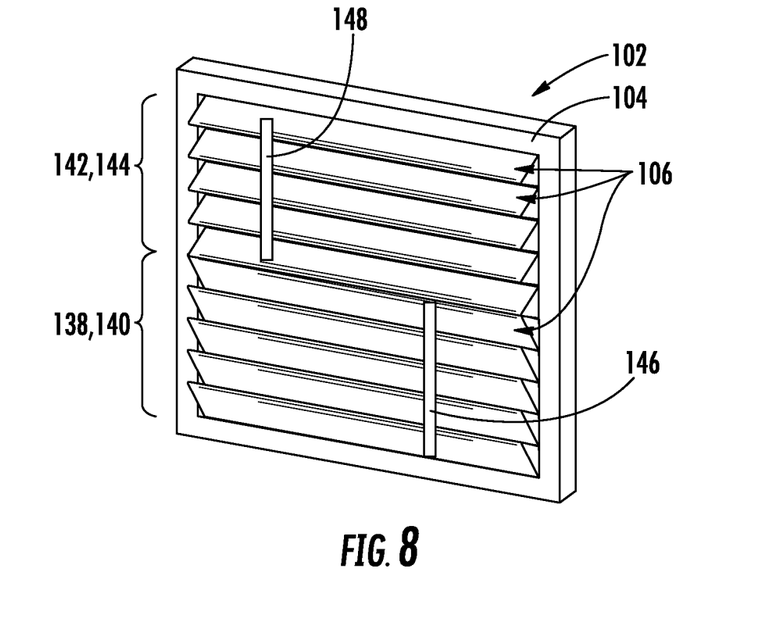
FIG. 8 illustrates a rear, perspective view of the louvered panel shown in FIG. 7.

For example, FIGS. 7 and 8 illustrate an alternative embodiment of the louvered end panel 102 in which the louvers 106 are separated or divided into two separate louver sections. Specifically, as shown, the louvers 106 of the louvered panel 102 include a first plurality of louvers 138 forming a first louver section 140 and a second plurality of louvers 142 forming a second louver section 144. In such an embodiment, the louvers 138 of the first louver section 140 may be configured to be pivoted about their respective pivot axes 108 independent of the louvers 142 of the second louver section 144. As a result, the louvers 138 of the first louver section 140 may be tilted or pivoted to a tilt angle 122 that differs from the tilt angle 122 of the louvers 142 of the second louver section 144. For instance, it may be desirable to tilt the louvers 138 of the first louver section 140 to a negative tilt angle to assist in preventing dust accumulation, while tilting the louvers 142 of the second louver section 144 to a positive tilt angle to redirect noise output from the engine compartment 84.

As particularly shown in FIG. 8, to allow the respective louvers 138, 142 of each louver section 140, 144 to be pivoted simultaneously, a corresponding connection member may be provided in operative association with each louver section 140, 144. Specifically, a first connection member 146 may be coupled to the louvers 138 of the first louver section 140, while a second connection member 148 may be coupled to the louvers 142 of the second louver section 144. Additionally, in such an embodiment, each of the connection members 146, 148 may, in turn, be coupled to a respective actuator 116 to allow the controller 132 to automatically adjust the tilt angle of the louvers within each louver section 140, 144 independent of the louvers of the other section.

Figure 9:
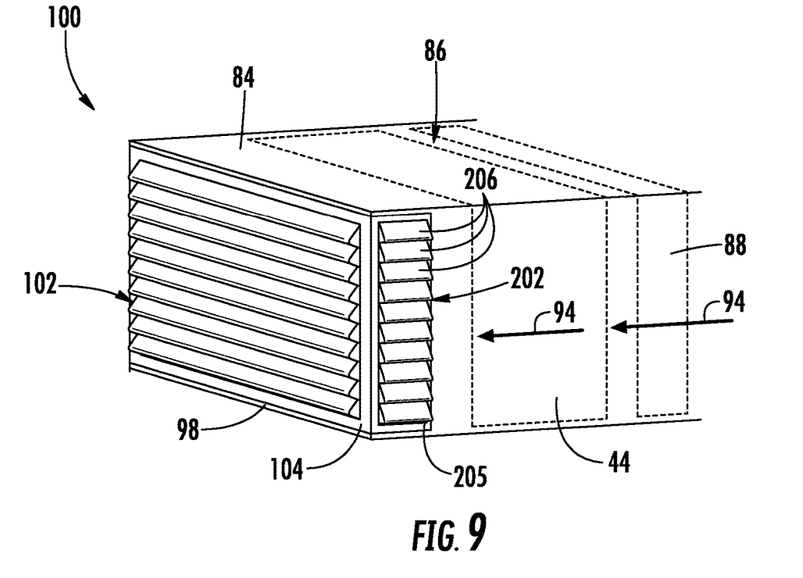
FIG. 9 illustrates a perspective view of another embodiment of a system for adjusting the flow orientation of an air flow exhausted from a harvester in accordance with aspects of the present subject matter, particularly illustrating the system including a louvered end panel and one or more louvered side panels.
Figure 10:
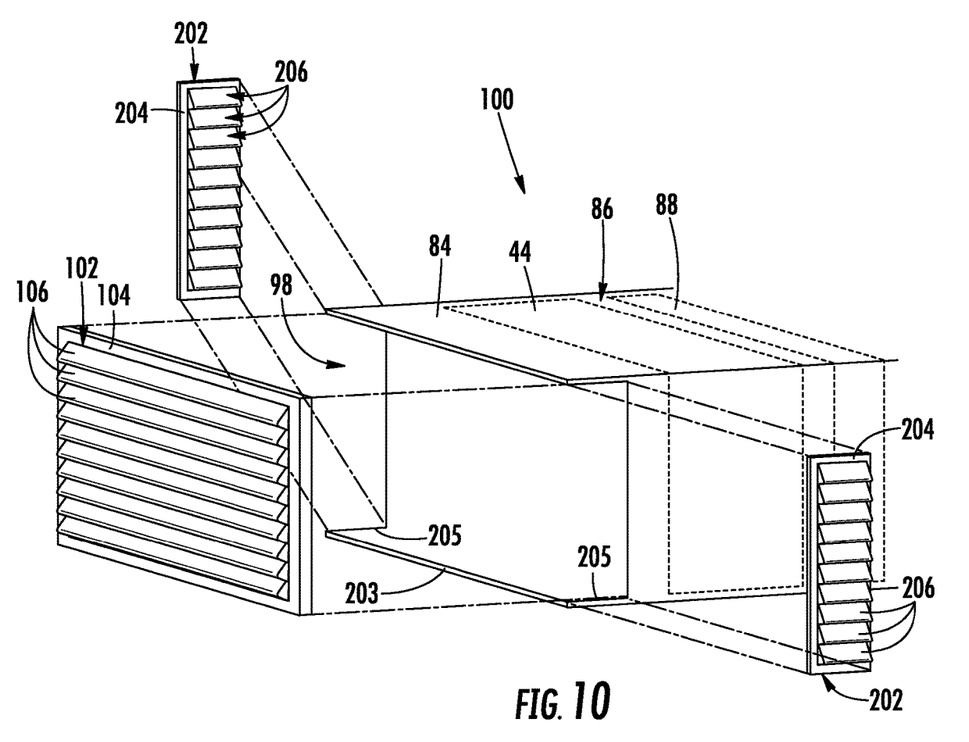
FIG. 10 illustrates an exploded view of the system shown in FIG. 9, particularly illustrating the various louvered panels exploded away from the engine compartment body of the harvester.

Referring now to FIGS. 9 and 10, another embodiment of the system 100 described above is illustrated in accordance with aspects of the present subject matter. As shown, unlike the embodiment described above, the system 100 includes both a louvered end panel 102 installed at the aft end of the engine compartment body 84 and one more louvered side panels 202 installed along portions of the side(s) of the engine compartment body 84. For instance, as particularly shown in FIG. 10, the opening 98 defined in the engine compartment body 84 at the flow exit location 96 includes both an end opening portion 203 defined through the aft end of the body 84 and side opening portions 205 extending from the end opening portion 203 along the opposed sides of the body 84. In such an embodiment, the louvered end panel 102 may be installed relative to the engine compartment body 84 at the location of the end opening portion 203 while first and second louvered side panels 202 may be installed relative to the body 84 at the locations of the side opening portions 205.

It should be appreciated that, in the embodiment shown in FIGS. 9 and 10, each of the louvered side panels 202 may be configured the same or similar to the louvered end panel 102 described above. For example, each louvered side panel 202 may include a panel frame 204 and a plurality of side louvers 206 pivotally supported within the panel frame 204 for rotation about their respective pivot axes (not shown). Additionally, each louvered side panel 202 may also be provided in operative association with one or more connection members and corresponding actuators. As a result, the system controller 132 may be configured to automatically control the actuator(s) associated with each side panel 202 to adjust the tilt angle(s) of the side louvers 206 contained within such side panel 202.

Figure 11:
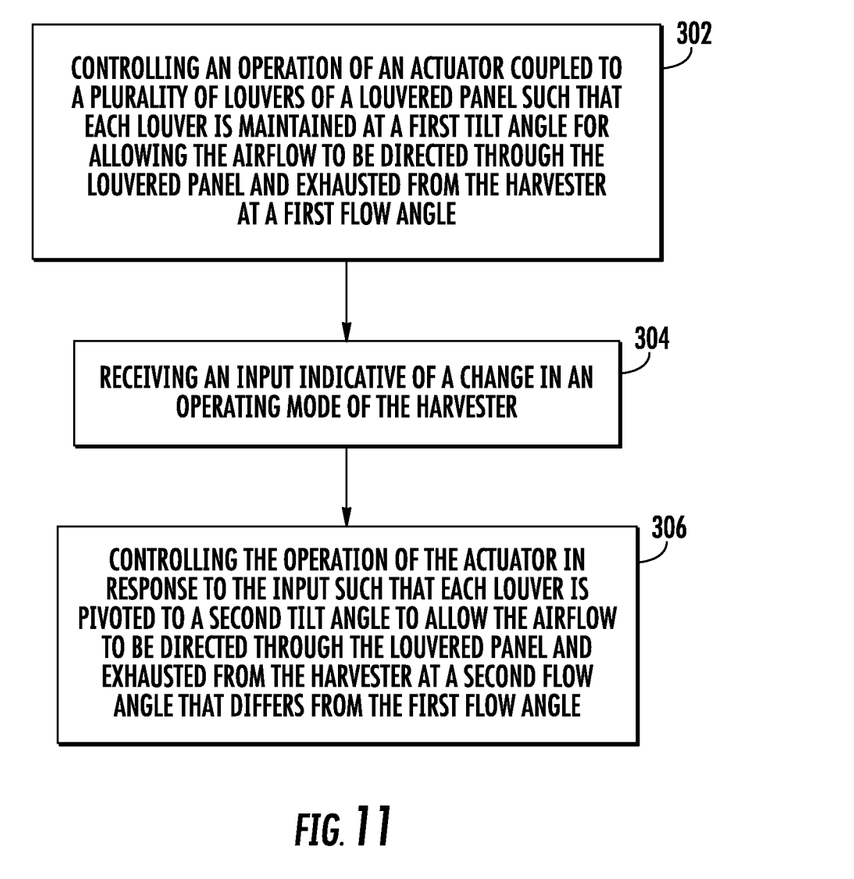
FIG. 11 illustrates a flow diagram of one embodiment of a method for adjusting the flow orientation of an air flow exhausted from a harvester in accordance with aspects of the present subject matter.

Referring now to FIG. 11, a flow diagram of one embodiment of a method 300 for adjusting the flow orientation of the air flow exhausted from a harvester is illustrated in accordance with aspects of the present subject matter. In general, the method 300 will be described herein with reference to the system 100 described above with reference to FIGS. 2-6. However, it should be appreciated by those of ordinary skill in the art that the disclosed method 300 may be implemented with any other system having any other system configuration, including any other suitable louvered panel configuration. In addition, although FIG. 11 depicts steps performed in a particular order for purposes of illustration and discussion, the methods discussed herein are not limited to any particular order or arrangement. One skilled in the art, using the disclosures provided herein, will appreciated that various steps of the methods disclosed herein can be omitted, rearranged, combined, and/or adapted in various ways without deviating from the scope of the present disclosure.

As shown in FIG. 11, at (302), the method 300 includes controlling an operation of an actuator coupled to a plurality of louvers of a louvered panel such that each louver is maintained at a first tilt angle for allowing the airflow to be directed through the louvered panel and exhausted from the harvester at a first flow angle. As indicated above, the controller 132 may be configured to automatically control the operation of the actuator 116 to adjust the tilt angle 122 of the various louvers 106. Thus, based on the desired tilt angle of the louvers 122, the controller may be configured to control the operation of the actuator 116 such that the louvers 106 are moved to and subsequently maintained at the desired tilt angle.

As shown in FIG. 11, at (304), the method 300 may include receiving an input indicative of a change in an operating mode of the harvester. For instance, as indicated above, the controller 132 may, in one embodiment, be communicatively coupled to various input devices 216 located in the operator's cab 34. In such an embodiment, one or more of the input devices 216 may be configured to provide an input to the controller 132 that is indicative of a change in the operating mode of the harvester 20.

Moreover, at (306), the method 300 may include controlling the operation of the actuator in response to the input such that each louver is pivoted to a second tilt angle to allow the airflow to be directed through the louvered panel and exhausted from the harvester at a second flow angle that differs from the first flow angle. For example, as indicated above, when the input received by the controller 132 is indicative of a change from the road mode to the harvesting mode, the controller 132 may be configured to control the operation of the actuator 116 such that the connection member 114 is actuated in the direction shown by arrow 124 in FIG. 4. Such movement of the connection member 114 results in the louvers 106 being pivoted to a downwardly oriented tilt angle, such as the negative tilt angle 122A shown in FIG. 4, thereby adjusting the air flow orientation through the louvered panel 102 to a downwardly oriented flow angle, such as the negative flow angle 126 shown in FIG. 4, to allow for the prevention and/or reduction in dust accumulation. Similarly, when the input received by the controller 132 is indicative of a change from the harvesting mode to the road mode, the controller 132 may be configured to control the operation of the actuator 116 such that the connection member 114 is actuated in the direction shown by arrow 128 in FIG. 5. Such movement of the connection member 114 results in the louvers 106 being pivoted to an upwardly oriented tilt angle, such as the positive tilt angle 122B shown in FIG. 5, thereby adjusting the air flow orientation through the louvered panel 102 to an upwardly oriented flow angle, such as the positive flow angle 130 shown in FIG. 5, to allow for the noise output from the harvester 20 to be redirected.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting a flow orientation of an air flow exhausted from an agricultural harvester at a flow exit location defined along an exterior of the harvester, the harvester including an engine disposed upstream of the flow exit location, the system comprising:
    a harvester body extending around at least a portion of the exterior of the harvester, the harvester body defining an opening at the flow exit location through which the air flow is directed after flowing past the engine;
    a louvered panel positioned within the opening defined by the harvester body, the louvered panel including a plurality of louvers, each louver being pivotable about a respective pivot axis extending longitudinally between opposed ends of the louver;
    an actuator coupled to the louvers, the actuator being configured to actuate the louvers such that each louver pivots about its respective pivot axis to adjust a tilt angle of the louver; and
    a controller communicatively coupled to the actuator, the controller being configured to:
        receive an input associated with an operating mode of the harvester; and
        control the operation of the actuator so as to automatically adjust the tilt angle of each of the louvers based on the operating mode of the harvester such that the tilt angle of each of the louvers corresponds to a desired tilt angle for the operating mode,
    wherein the air flow is directed through the louvered panel and is exhausted from the harvester at a flow angle corresponding to the tilt angle of each of the plurality of louvers.

2. The system of claim 1, further comprising a connection member coupled between the actuator and each of the louvers, the actuator configured to actuate the connection member such that the louvers are simultaneously pivoted about their respective pivot axes.

3. The system of claim 1, wherein the louvered panel further comprises a panel frame coupled to the harvester body, each louver being pivotally coupled to the panel frame at its opposed ends.

4. The system of claim 1, wherein the plurality of louvers includes a first plurality of louvers forming a first section of louvers and a second plurality of louvers forming a second section of louvers, the first section of louvers configured to be pivoted about their respective pivot axes independent of the second section of louvers to allow the tilt angle of each of the first plurality of louvers to differ from the tilt angle of each of the second plurality of louvers.

5. The system of claim 1, wherein, when the operating mode corresponds to a harvesting mode of the harvester, the desired tilt angle for the louvers is associated with exhausting the air flow from the harvester at a downwardly orientated flow angle.

6. The system of claim 1, wherein, when the operating mode corresponds to a road mode of the harvester, the desired tilt angle for the louvers is associated with exhausting the air flow from the harvester at an upwardly orientated flow angle.

7. The system of claim 1, wherein the louvered panel corresponds to one of a louvered end panel positioned at an aft end of the harvester body or a louvered side panel positioned along a side of the harvester body.

8. The system of claim 1, wherein the opening includes both an end opening portion defined at an aft end of the engine compartment body and a side opening portion extending along at least one side of the harvester body, the louvered panel corresponding to a louvered end panel positioned within the end opening portion of the opening, further comprising a louvered side panel positioned within the side opening portion of the opening, the louvered side panel including a plurality of side louvers, each side louver being pivotable about a respective pivot axis extending longitudinally between opposed ends of the side louver.

9. An agricultural harvester, comprising:
    a fluid cooling system;
    an engine positioned downstream of the fluid cooling system;
    an engine compartment body defining an engine compartment for housing the fluid cooling system and the engine, the engine compartment body further defining an opening at a flow exit location positioned downstream of both the fluid cooling system and the engine such that an air flow directed through the engine compartment flows past the fluid cooling system and the engine prior to flowing through the opening;
    a louvered panel positioned within the opening defined by the engine compartment body, the louvered panel including a plurality of louvers, each louver being pivotable about a respective pivot axis extending longitudinally between opposed ends of the louver;
    an actuator coupled to the louvers, the actuator being configured to actuate the louvers such that each louver pivots about its respective pivot axis to adjust a tilt angle of the louver; and
    a controller communicatively coupled to the actuator, the controller being configured to:
        receive an input associated with an operating mode of the harvester; and
        control the operation of the actuator so as to automatically adjust the tilt angle of each of the louvers based on the operating mode of the harvester such that the tilt angle of each of the louvers corresponds to a desired tilt angle for the operating mode,
    wherein the air flow is directed through the louvered panel and is exhausted from the harvester at a flow angle corresponding to the tilt angle of each of the plurality of louvers.

* * * * *